United States Patent

[11] 3,582,562

[72] Inventor Daniele Jr. Sellari
Corinth, Miss.

[21] Appl. No. 822,549
[22] Filed May 7, 1969
[45] Patented June 1, 1971
[73] Assignee International Telephone and Telegraph
New York, N.Y.

[54] KEY TELEPHONE INTERCOMMUNICATION SYSTEM
6 Claims, 2 Drawing Figs.

[52] U.S. Cl. .......... 179/18AD, 179/84VF;99
[51] Int. Cl. .......... H04m 1/00
[50] Field of Search .......... 179/18 AD, 99, 84 VF, 27.02, 37

[56] References Cited

UNITED STATES PATENTS

| | | | |
|---|---|---|---|
| 3,430,002 | 2/1969 | Roscoe | 179/84F |
| 3,128,349 | 4/1964 | Boesch et al. | 179/84VF |
| 3,014,097 | 12/1961 | Apt | 179/18AD |

*Primary Examiner*—Kathleen H. Claffy
*Assistant Examiner*—Thomas W. Brown
*Attorneys*—C. Cornell Remsen, Jr., Walter J. Baum, Percy P. Lantzy, J. Warren Whitesel, Delbert P. Warre and James B. Raden

ABSTRACT: A key telephone system using multifrequency - signalling principles to provide two digit selective dialling. On receipt and acceptance of a first digit, a selected one of a first group of lines of is rung. If the received digit is a predetermined one (the digit 2 being generally used for this purpose), ringing is inhibited to allow transmission and receipt of a second digit to ring the selected line from a second group of lines.

INVENTOR
DANIELE SELLARI
BY
ATTORNEY

KEY TELEPHONE INTERCOMMUNICATION SYSTEM

This invention relates to key telephone systems and more particularly to pushbutton controlled systems for providing intercommunication between 10 or more stations.

The term "key telephone system" is generally understood to include a telephone set having a plurality of keys or pushbuttons thereon. These keys may be used for selecting either an individual line to a central office or a line associated with an intercommunication system. If an intercommunication key is pressed to select the intercom line and then pushbuttons are manipulated to identify a particular line, local PBX-like switching equipment selects and rings over the identified line. Generally, although not always, both lines and the switching equipment are on the same premises.

Usually, these key systems are adapted to give intercommunication service to 10 or less subscribers who are individually identified by the 10 digits on a dialer. Here, it is only necessary to push a button once, and the identified phone rings. Some times, however, it is desirable to give key system service to more than 10 stations. In this case, it is the practice to select a particular digit—such as "2"—which the equipment may always recognize as indicating that the called station is identified by—not one—but two digits. Thus, for some calls, it is necessary to send two digits. If any number, other than "2" is dialed as a first digit, a ringer in a first group rings at a station location identified by that single digit. If the digit "2" is dialed as a first digit, a changeover occurs, but no ringer sounds. Thereafter, a second digit selects a ringer in the second group, and ringing current is sent to that ringer.

Recently, telephone sets have been modernized to use pushbutton dialers which send multifrequency tones to represent the individually dialed digits. As these pushbutton dialers have replaced the rotary dials, the tendency has been to leave the key system as it stood before the pushbutton dials came into use. Instead of designing an entirely new key system which makes a maximum use of the newer technologies, the tendency has been to insert an adapter between the pushbutton telephone and the older equipment operated by the rotary dial key system. Very often, the results have been a hybrid system using less than the best of both modern and old technology.

Accordingly, an object of this invention is to provide new and improved key telephone systems for pushbutton dial telephone sets. A more particular object is to provide key telephone systems which may complete intercommunication calls to more than 10 stations.

A further object of this invention is to provide a compact, modern key telephone system using primarily electronic components having the best technical capability and the lowest cost. A further object is to eliminate older and slower electromechanical components except where such components are best adapted to serve a particular functional need.

In keeping with an aspect of this invention, these and other objects are accomplished by providing an electronic circuit which is triggered into operation responsive to a predetermined first digit. A digit "2" inhibits the system and precludes any response, except for the storage of a memory that this first digit has occurred, and the changeover to select a second group of lines. Hence, no ringing current is sent out. After expiration of the digit "2," the system is enabled, and it may thereafter respond to a second digit. Thus, any number, up to 19, lines may be accommodated.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
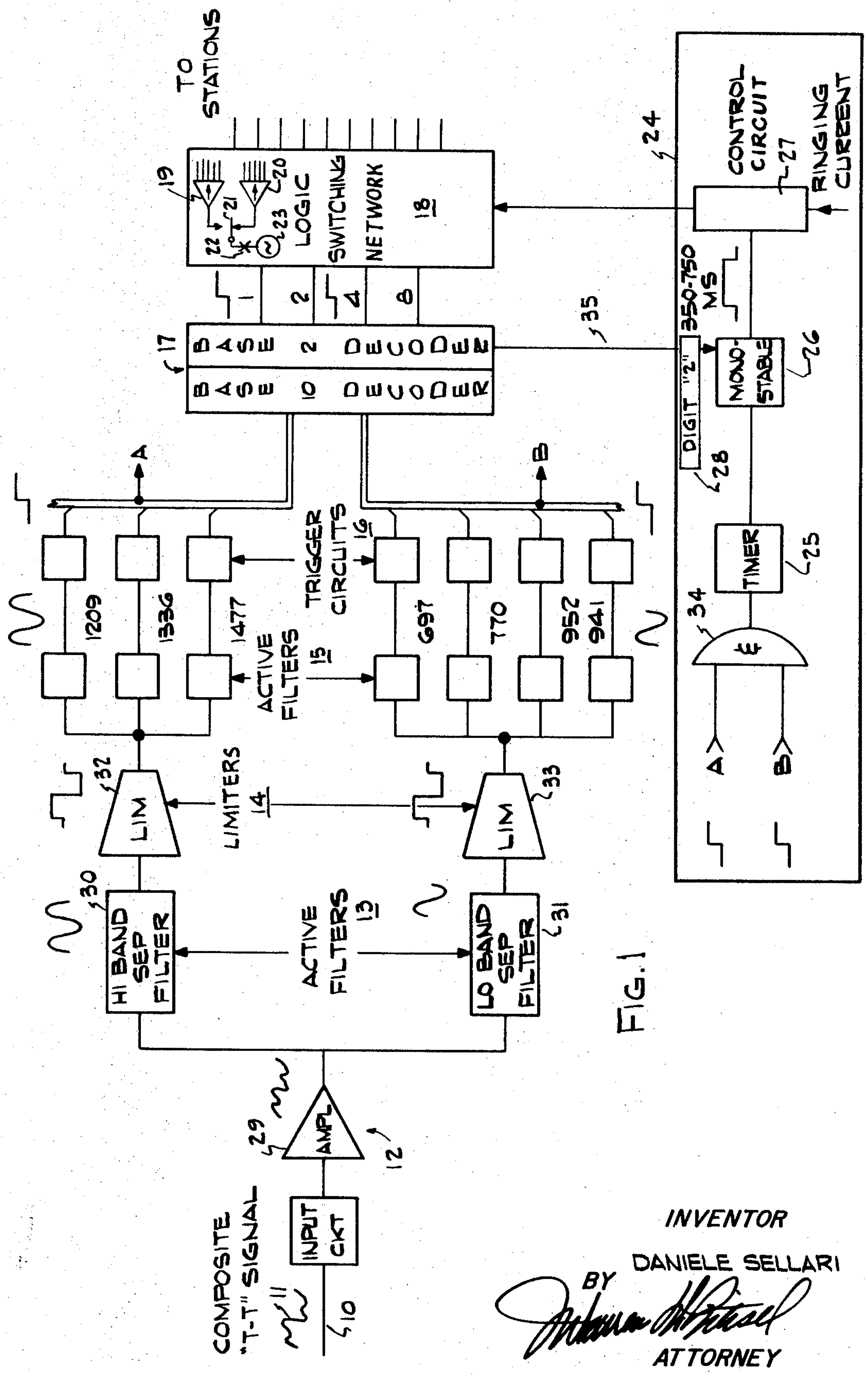
FIG. 1 is a block diagram which explains the principle of the invention.

In FIG. 1, the reference character 10 indicates a wire which may be connected to a telephone subscriber line. The signal 11 appearing thereon represents any electrical signal appearing on the telephone line, such as: voice signals, pushbutton dial signals, noise, or the like. The immediate problem is to separate the dial signals from all other signals, for accepting the dial and rejecting the other signals. The voice signals will, of course, be used by any other equipment.

The remaining components in FIG. 1 are an input circuit 12 for bringing all valid digital signals to a predetermined signal strength, filters 13 for separating the conventional digital frequencies into the high and low bands, limiters 14 for guarding against spurious response and shaping the resulting signals, active filter circuits 15 for separating the bands into their individual component frequencies, trigger circuits 16 for giving an output signal when any corresponding dial frequency is received, decoders 17 for converting the combination of tones into digit identifications, and a relay contact logic switching network 18 for sending ringing or other signal currents to a selected telephone station.

Those who are familiar with relay contact logic will readily recognize the term "tree" as indicating an arrangement for connecting an input wire to any output wire by the selective operation of a group of relays, in a coded combination. Each "tree" within network 18 is represented in FIG. 1 by a triangle 19, 20. The contact logic extends the connection from the apex, in the direction of the arrow, to any of the many wires indicated at the vertical base of the triangle. A contact 21 selects either the contact tree 19 or the contact tree 20. Thus, the first digit may select any wire in the group 20, reached via unoperated contacts 21. If the first digit is "2," the contacts 21 operate, and thereafter, the second digit selects any wire in the group 19. After a wire is selected in either group, the contacts 22 are closed, and ringing current is sent from the generator 23 to the selected wire in the selected group.

The circuit 24 includes a timer circuit 25, a monostable circuit 26, and a control circuit 27 which adapts the system to send ringing current. If the digit "2" is received as a first digit, a circuit 28 operates to select the second group, as represented by the contacts 21. This extends the switching capacity to more than the 10 stations which are identified by the decimal digits on a pushbutton telephone dial.

In operation, a calling subscriber station sends the multifrequency signals of the well-known pushbutton dial commonly used in North America and elsewhere. The input amplifier 29 raises the input signal levels to the point necessary for them to pass through the band separation filters 30, 31 and to operate the limiters 32, 33. The input amplifier 29 has an automatic gain control which tracks the strongest composite input frequency amplitude and thereby determines the amount of amplification within the amplifier. The limiters 32, 33 are set to operate within a range having a lower limit which is −10 db. below the constant amplitude output. Therefore, if a second input frequency has a strength that is less then −10 db. below the strongest frequency, it also has a sufficient level to operate the limiters. However, if the amplitude of a second input frequency is more than −10 db. below the strongest frequency, it does not have an amplitude which is sufficient to operate the limiters 32, 33. Thus, as a first guard circuit, the limiters demand two signal frequencies having approximately the same strength.

After amplification, at 29, the signal is sent to the two bandpass filters 30, 31 which separate the multifrequency signals into two groups—one a high band group and the other a low band group. The low band filter rejects all frequencies above 1,185 c.p.s., and the high band filter rejects all frequencies below 965 c.p.s.

There is a separate limiter 32, 33 for each of the two frequency groups. The particular frequency having the largest input amplitude dominates the output. Ideally, each limiter converts a signal frequency, sinusoidal wave into essentially a square wave of fixed amplitude. Thus, to add noise immunity by a guard action, the limiter output consists of the fundamental and its odd harmonics.

After band separation, perhaps one of the limiters has, at its input, not only a potentially troublesome tone, but also energy at other frequencies. The signal tone appearing at the limiter output, may then have less than the standardized amplitude, and it does not pass through its active filter with sufficient strength to operate the trigger circuit. The limit to this procedure is reached when noise accompanying a bona fide signal is emphasized to the point of preventing the signal from being registered; therefore, the limiter threshold must be set for a guard factor of about 10 db.

The square wave from each limiter is sent to the active filters 15 tuned to the standard pushbutton frequencies 1209, 1336, etc., as indicated in the drawing. A recognition bandwidth of ±2 percent to ±2.5 percent of the nominal channel frequency is generally provided to allow for variations in manufacturing tolerances, temperature changes, components aging, and frequency shifts occurring in transmission.

After separation of the fundamental signal tones by the filters, they are sent to the associated trigger circuit. The corresponding trigger circuits change their DC output states, and signals are sent to suitable decoders 17. The signals stored in the decoder 17 operate relays which select and control a contact tree 20 leading to a particular telephone station identified by the digits which trip the trigger circuits 16. The control circuit 24 forwards ringing current over the wire selected by the contact tree 20 to a station in the first group—unless the first digit is the digit "2." In that case, the control circuit 24 withholds ring current and contacts 21 operate. When a second digit is received to reset the contact tree 19, ringing current is sent to a station in the second group of stations.

The DC voltage shifts at two points A, B whenever there is at least one signal tone in the high and low frequency bands, respectively. Since all valid signals are a combination of two tones, it is obvious that all valid signals produce coincidental voltage changes at terminals A, B in the control circuit 24. Thus, all valid digital signals cause the AND gate 34 to conduct and trigger the timer 25. The timer measures a 20-millisecond period during which a valid digit signal must persist before it can be effective; this gives a degree of voice immunity to prevent a response to signals of the digital frequencies which may randomly occur during normal speech.

After the proper time, timer 25 triggers a monostable circuit 26, and it operates a relay at 27 to send ringing current to any line selected by the relay contact tree 20. If the digit "2" is indicated over the wires 35, the monostable circuit 26 is inhibited by the "Digit 2" circuit 28 so that it does not switch. Ringing current is precluded by relay 27 during period while the system is able to respond to the first stored digit. Thereafter, the monostable circuit returns to normal, relay 27 returns to normal, contacts 21 remain locked in an operated condition, and the system is enabled to send ringing current when the next digit is received.

Figure 2:
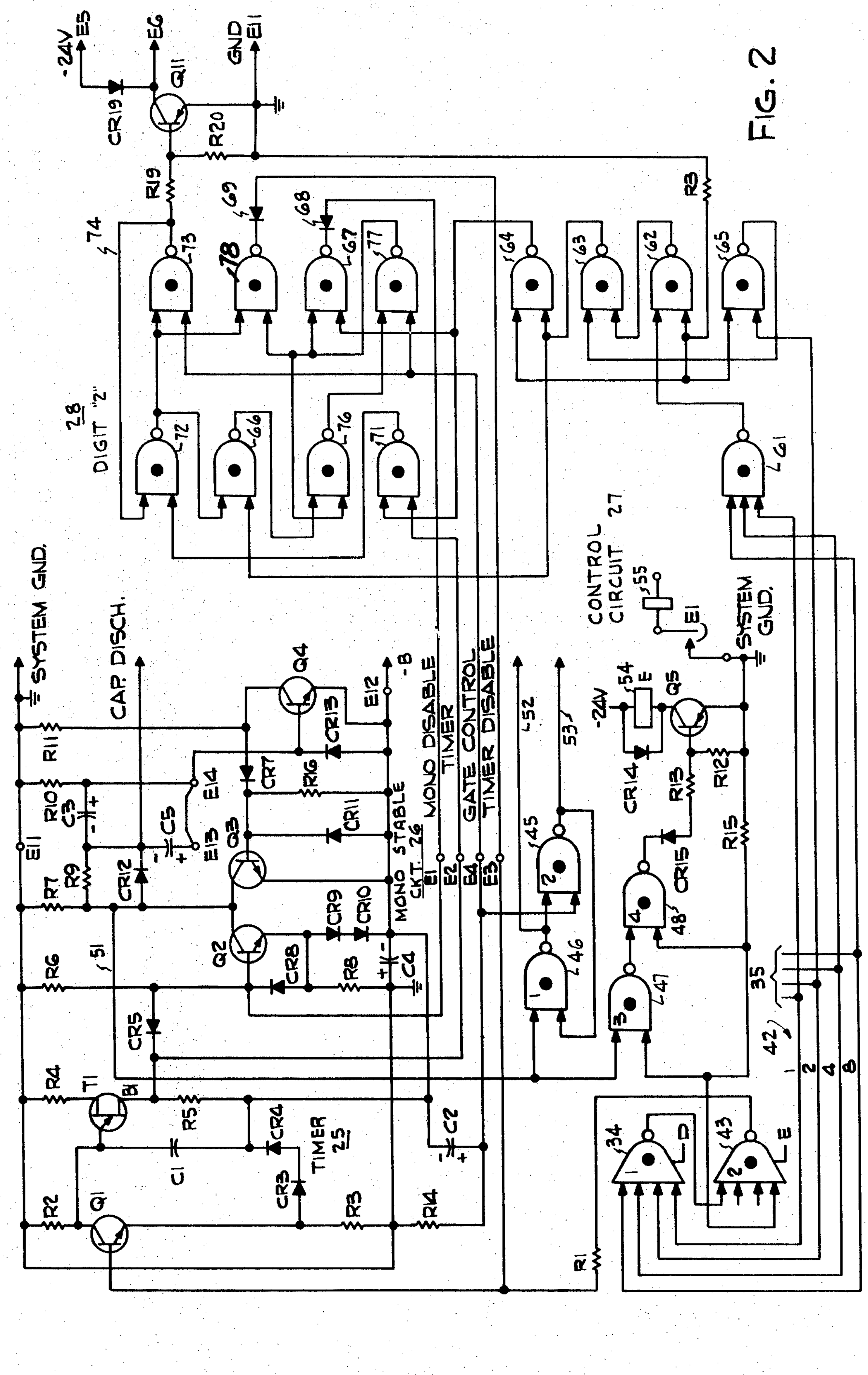
FIG. 2 is a combined schematic and logic diagram which explains how the system is adapted to serve any number, up to 19, subscriber stations.

The details of the control circuit 24 are shown in FIG. 2.

The digit stored in the decoder 17 is indicated on the wires 35 (lower left-hand corner of FIG. 2) and sent to the NAND gate 34. As indicated at 42, the digits received from decoder 17 are in the binary form wherein conductors "1, 2, 4, 8" are energized in a coded combination wherein the sum of the indicated digits (1, 2, 4, 8) equals the decimal value of the received digit. Hence, the gate 34 responds whenever any of the wires 35 are marked (i.e., when any digit is received). Logically, gate 43 serves only as an inverter to reverse polarity. The "D" pin and the "E" pin on gates 34, 43 might be marked to inhibit any responses which may be indicated by the digits appearing on the wires 35. This inhibit has no particular function in any given circuit. Rather, it is a control point which may be marked as a matter of local option. For example, local digital processing equipment or a maintenance man may wish to override the system. If NAND gate 34 does not conduct, timer 25 cannot operate, and no ringing current is sent.

The remainder of FIG. 2 includes the timer 25, monostable circuit 26, control circuit 27, and the "Digit 2" circuit 28. These circuits include only well-known discrete components, NAND gates, and relays. Therefore, it is thought that they will be fully understood from a description of the individual components circuits and the operations thereof.

In the NAND gates such as 45, the output is ground if a negative battery potential appears at any input. The gate output switches to negative battery when both inputs simultaneously stand at ground.

Normal Condition

When the −B battery is connected and power is first supplied to the circuit, the capacitor C2 begins to charge through resistor R14 to ground. This RC network causes a negative potential (−B) to appear at an input of gate 45 for approximately 2 milliseconds. Thus, the output of gate 45 is initially at a ground potential which is fed back to an input of gate 46. The other input of gate 46 is also at ground potential applied through resistor R7. This results in a −B volts potential at the output of gate 46 and at the input of gate 45 which latches the output of gate 45 for applying a ground potential to an input of gate 46.

The output of gate 43 is a negative −B volts which forwardly biases the transistor Q1 causing it to turn on and move into saturation. The capacitor C1 is shorted, and it does not charge. Therefore, the base threshold of the unijunction transistor T1 is not exceeded, and a −5 volts appears across resistor R5. Therefore, the base threshold of the unijunction transistor T1 is not exceeded, and a negative potential appears across resistor R5 (i.e., −B batter, resistor R5, diode CR5, resistor R6, ground). Therefore, the base of transistor Q2 is also made negative in respect to its emitter through the diode CR5. The transistor Q2 is biased off, and the monostable circuit 26 (i.e., the output at the collector of transistor Q2) is at a ground potential applied through resistor R7. Ground appears at an input of the gates 46 and 47. The other input of gate 47 is clamped through resistor R15 to ground. Thus, the output of gate 47 is at a negative potential which appears at one input of gate 48. The other input is clamped to a ground potential through resistor R15. Since battery appears at one input, the output is ground and the diode CR15 is reverse biased. The transistor Q5 is switched off, which results in the nonenergizing of the E relay 54.

First Digit

Means are provided for measuring a 20-millisecond period whenever the conductors 35 are marked to indicate the presence of a potentially valid digital signal. This means is the timer 25 which includes the NPN transistor Q1 and the unijunction transistor T1, an RC timing circuit C1, R2, biasing resistors R3, R4, R5, and biasing diodes CR3, CR4.

Before a digit is received, the input to the timer 25 is supplied from the inverter 43 through a coupling resistor R1 to the base of the transistor Q1, which turns on. A resistor R2 is the collector load for the transistor Q1. The emitter bias is supplied over a circuit traced through diodes CR3 and CR4 to the battery −B. The collector of the transistor Q1 is connected directly to the base of the unijunction transistor T1. One of the two bases of the unijunction transistor is biased via resistor R4, and the other base is biased via a voltage divider including resistor R5, diode CR5, and resistor R6. The capacitor C1 is short circuited.

When a digit is received, the transistor Q1 is turned off from gate 43, capacitor C1 is charged (−B battery, capacitor C1, resistor R2) to about 5 volts. Current also flows from ground through resistor R6, diode CR5, and resistor R5 to the −B battery. The voltage divisions through diodes CR4, CR3, and resistor R3 make the emitter of transistor Q1 about 1 volt above the voltage on the negative side of the 5-volt charge on the capacitor C1. Due to the voltage drop through diode CR5, the potential on the base of the transistor Q2 is about 0.5 volts less negative than the voltage on the base B1 of the unijunction transistor T1. The net effect is that the circuit is biased to a threshold near a trigger state, with transistors Q1, T1, and Q2 turned off. The capacitor C1 charges through the resistor R2 toward the trigger voltage of the unijunction transistor T1. In 20 milliseconds, the resulting voltage change turns on the unijunction transistor T1, and capacitor C1 begins to discharge through the resistor R5. The discharge current back biases the diode CR5.

The monostable circuit includes a pair of transistors Q2, Q3, each being coupled in a common emitter configuration. These two transistors are used in parallel to supply an adequate amount of power. These two transistors share a common collector load resistor R7. The base bias is applied to transistor Q2 through resistor R8 and diode CR8. The emitter bias is applied through the diodes CR9, CR10 which set a threshold level for turning on the transistor Q2. The current flow through the resistor R6, diode CR5, and resistor R5 sets a voltage at the base of the transistor Q2 which is about 0.5 volts above the −5 volt charge on the capacitor C1. The emitter voltage is about 1 volt above the −5 volt charge. This holds the transistor Q2 off. When the capacitor C1 discharges sufficiently through the unijunction transistor T1 and resistor R5, the base of the transistor Q2 becomes positive with respect to its emitter, and transistor Q2 turns on to change the voltage on wire 51, from ground to −B volts, thereby starting a ringing period.

Normally, an NPN transistor Q4 is switched on by a ground voltage applied through the resistor R10 to its base. A diode CR13 is back biased by this ground to isolate the base from the −B battery potential. The collector of the transistor Q4 is coupled through a diode CR7 to the base of the transistor Q3. Hence, when the transistor Q4 is turned on, the diode CR7 is back biased, no current flows through the resistor R16, and the transistor Q3 does not receive an "on" bias potential via the resistor R11.

The transistor Q2 turns on for a short pulse period while the capacitor C1 discharges. When the transistor Q2 turns on it draws current through the resistor R7, and the resulting voltage drop causes the capacitors C3, C5 to charge over a circuit traced from ground through the resistors R7, R9, and capacitors C3, C5 to the base of the transistor Q4. The transistor Q4, which had been biased "on" via resistors R10, now turns off. This removes the back bias from the diode CR7, and the voltages divide across resistor R11 and R16 in a manner which turns on and saturates the transistor Q3. The transistor Q3 draws current to maintain the switched voltage on the wire 51.

When the capacitor C3 has charged sufficiently, through the resistor R10, the off-bias is removed from the transistor Q4, which turns on again responsive to the ground bias applied through the resistor R10. The diode CR7 is back biased again, and the transistor Q3 is turned off. Responsive thereto, the voltage on wire 51 switches back to ground.

As will become more apparent, the system sends a single burst of ringing current to the selected line. The burst begins when the transistor Q2 turns on to switch the potential on the wire 51 from ground to −B volts, and ends when it switches back to ground.

More particularly, the output from the monostable circuit 26 is taken from the common circuit connected to the collectors of the transistors Q2 and Q3. Before the transistors Q2 and Q3 turn on, the output conductor 51 is standing at approximately ground potential, applied via resistor R7. After the transistors Q2, Q3 turn on, the conductor 51 is switched to the potential of the −B battery applied through the emitters of the transistors Q2, Q3. The capacitor C4 absorbs any transient spikes which may occur.

When the conductor 51 changes from ground to −B potential, the voltage at the inputs of the gates 46, 47 also changes to battery. The other input to gate 46 is standing at ground potential from the output of gate 45. This causes the output of the gate 46 to send a ground signal over the conductor 52, and to the gate 45. The output of gate 45 is battery potential to latch the gate 46. Wires 52 and 53 are applied to disable the base 10 decoder, thus preventing the accepting of any additional signals especially voice generated digit simulation. Gates 46 and 45 are reset by gate control. The change of potential on the conductor 51 also switches the states of the gates 47, 48 to forwardly bias the diode CR15. (Battery on wire 51 produces ground at the upper input of gate 48; the coincidence with ground at the lower input produces battery at CR15). As a result base current flows from the transistor Q5, causing it to switch on and saturate. The resulting current flow from system ground operates a relay 54 which closes its contacts E1 and thereby performs a suitable logic function, such as operating relay 55, for example. The use made of the operation of this relay is not important to the invention. However, in one particular system, this relay 55 sends ringing current to the called line. When transistor Q4 turns on after the capacitor C3 has charged, diode CR7 is again back biased. The transistor Q3 turns off, the voltage on wire 51 returns to ground, relay 54 releases, contacts E1 open, relay 55 releases, and ringing current terminates. Or, any other function may be performed. The subscriber has been rung once, as is conventional in key systems. If repeated ringing is desired, the relay 55 is arranged to supply ringing continuously until a called party answers.

Second Digit

Two digit operation occurs when the first digit is the digit "2." This digit "2" operates the gates on the right-hand side of FIG. 2 and cancels the ringing normally responsive to the first digit. Functionally, the effect is described by the operation of contacts 21 (FIG. 1) which causes a changeover to a second group of lines 19. The second digit will then select one from among this second group 20.

In greater detail, one input to each of the gates 62, 64, 65 is clamped to a ground potential which is applied thereto via the resistor R3. An input to gate 65, connected to wire 2, normally is at the ground potentials on the unmarked wires 35, except when the digit "2" is received and this wire goes to −B volts. Normally (no digit), the voltages appearing on all of the wires 35 are at ground potential, and −B volts appear at the output of the gate 61. The output terminal of the gate 62 is then at a ground potential. The gate 65 receives ground at each of its inputs; thus, its output is −B volts, as is an input to the gate 63. Also, an input of the gate 64 is −B volts and its output is at ground potential. The ground output of gate 64 is passed to the input of gates 67, 71. If this process is continued, it will be found that the output of gate 67 is at ground, and the diode 68 is back biased. While the diode 68 is so back biased, the pin E1 does not receive a disabling signal, and the monostable circuit is able to function. That is, the monostable circuit 26 may cause the system to send out a burst of ringing current responsive to a digit. A similar analysis disclosed that the diode 69 is also back biased so that no inhibiting signal is sent to the timer 25; or, conversely stated, the timer 25 is enabled.

The remaining parts of the "Digit 2" circuit 28 are a current limiting resistor R19 for applying a bias to the base of the transistor Q11. A resistor R20 is coupled between the base and emitter to bleed off the base current. The diode CR19 protects the transistor Q11 from transients which may appear at the output terminal E6. For example, if a relay winding is connected to this point, it may cause transients as it switches on and off.

The circuit for detecting the digit "2" is now standing in a normal, energized condition.

Assume next that the digit "2" is the first digit to be received during any given call. This digit is indicated by a −B volt potential on the "2" conductor in wires 35, all of the other wires are at ground potential. Therefore, a battery potential appears at the lower input of the gate 65, and ground appears at all inputs of gate 61. This forces the output of the gate 65 to move to a ground potential. The output of gate 61 remains at −B volts output. This means that the output of the gate 62 is at ground potential. Hence, both inputs of the gate 63 are at ground, and its output is −B volts. The resulting change of potential at the input of the gate 64 forces its output to ground. The output of gate 66 remains at ground, because it receives −B volts from gate 63.

Means are provided for inhibiting the timer and monostable circuits for the duration of a first "2" signal. With the output of gate 64 now standing at ground, both inputs of the gate 67 are at ground, and a negative −B volt output is applied to the cathode of the diode 68. When this occurs, the diode 68 conducts, and a clamping negative voltage is applied to the base of the transistor Q2. The monostable circuit 26 is now disabled so that it cannot respond to the first digit. This means that the potential on wire 51 cannot change state, and there can be no response at relay 54 to the initial digit "2." With the output of gate 72 standing at battery, the output of gate 78 is ground. Thus, the diode 69 clamped to the base of transistor Q1 is reverse biased, keeping the timer enabled.

The ground potential out of the gate 64 reaches the upper input of gate 71. The lower input of gate 71 receives a battery potential via resistor R6 until capacitor C1 discharges thru the unijunction transistor T1 to apply a ground pulse to the input of gate 71. The output of gate 71 is pulsed to –B volts. The lower input of gate 72 also receives –B volts so that the output is ground and is applied to an input of gate 78 forcing its output to battery. Diode 69 is forward biased thus disabling the timer. The lower input of gate 73 is already at ground applied through the resistor R14; thus, the output is –B volts. This negative output is fed back at 74 to latch the gates 72, 73 in the described condition. The –B volts out of gate 73 draws current from the base of transistor Q11, causing it to turn on and saturate. Responsive thereto ground is applied from the emitter of the transistor Q11 to the output pin E6. The output signal at pin E6 causes the logic circuit 18 (FIG. 1) to operate the contacts 21 and change over to a second group of lines reached via the contact trees 19.

Before the initial digit "2" terminates, the lower inputs of gates 64, and 66 stand at –B volts. Also, the output of gate 72 is standing at ground and in a latched condition. Therefore, the output of gate 66 is also at ground.

When the initial digit "2" terminates, the output of gate 65 goes to a –B volt potential, because ground returns to conductor 2 (lower input of gate 65). Therefore, the input potentials at gate 63, also goes to –B volts potential, and the output to ground. Since the output of gate 72 is also at ground, there is a coincidence of two ground signals at the input of gate 66, and its output goes to –B volts. With this battery marking at its upper input, the output of gate 76 goes to ground. The resulting coincidence of ground voltage at the two inputs of gate 77 causes a –B volts at the output of gate 77. The negative output of gate 77 is fed back to the input of gate 67. The gate 67 provides a ground output to back bias diode 68 and reenable the monostable circuit 26. The negative output from the gate 77 also energizes the input of the gate 78 to cause it to switch its outputs to ground. Thus, ground also appears on the cathode of the diode 69 to back bias it to remove the inhibit potential from the timer 25. Both the timer and the monostable circuit are now enabled, and each can respond to the next digit regardless of what it is.

On the second digit, the circuit operates as it did during the first digit, except that the ringing current is sent to a selected line in the second group of lines 19 (FIG. 1) because the contacts 21 are now operated responsive to the signal which appeared at the output pin E6.

While the principles of the invention have been described above in connection with specific apparatus and applications, it is to be understood that this description is made only by way of example and not as a limitation on the scope of the invention.

I claim:

1. A key telephone system comprising multifrequency responsive validating and switching means, control means responsive to the receipt of a multifrequency digital selection signal for selecting a line in a first group of lines, said line being identified by the numerical value of said first digit, means responsive to the receipt of a predetermined multifrequency digital selection signal for selecting a second group of lines, means responsive to the receipt of a second multifrequency digital selection signal for selecting a line in said second group of lines, said last-mentioned line being identified by the numeric value of said second digit, and means for timing the continuation of a digital signal for a predetermined time before sending signaling current over the line selected by either of said digits.

2. The system of claim 1, wherein there is control circuit means associated with said timing means for sending signaling current over said line, said control circuit comprising second timing means for measuring a predetermined period of time after signaling current is sent over the line, and inhibiting means comprising means for disabling said first-mentioned timing means for the period of time during which said control circuit can respond to receipt of a digital signal.

3. The system of claim 2, wherein said first-mentioned timing means measures a predetermined validating period of time immediately following the receipt of any of said multifrequency digital signals, and output means responsive to the timeout of said other timer for triggering the second timing means to enable said responses to the receipt of said multifrequency signal.

4. A key telephone selection and signalling system for multifrequency selection, comprising:

a multifrequency receiver for receiving and validating received selection signals and for converting said signals into digital signals, a first group of lines and a second group of lines, a control circuit, means responsive to receipt of a first digital signal for connecting said first group of lines to said control circuit, means operative on receipt by said receiver of a valid digital signal for signaling the line corresponding to the selection signal received, means responsive to receipt of a predetermined digital signal for disabling said line signaling means, and means responsive to receipt of said predetermined digital signal for connecting said second group of lines to said control circuit and for removing the disabling of said line signaling means.

5. A system as claimed in claim 4, wherein said control circuit comprises means for timing the duration of said digital signal prior to the operation of said line signaling means.

6. A system as claimed in claim 5, wherein said control circuit further comprises means for timing the duration of operation of said line signaling means.